Oct. 9, 1923.

W. C. NABORS

TRACTOR TRAILER

Filed Jan. 5, 1920

WITNESSES
J H Crawford

INVENTOR
W. C. Nabors,
BY Munn & Co.
ATTORNEYS

Patented Oct. 9, 1923.

1,470,328

UNITED STATES PATENT OFFICE.

WILLIAM CAMPBELL NABORS, OF MANSFIELD, LOUISIANA.

TRACTOR TRAILER.

Application filed January 5, 1920. Serial No. 349,442.

*To all whom it may concern:*

Be it known that I, WILLIAM C. NABORS, a citizen of the United States, and a resident of Mansfield, in the parish of De Soto and State of Louisiana, have invented certain new and useful Improvements in Tractor Trailers, of which the following is a specification.

My present invention relates generally to trailing vehicles for automobiles, trucks or in fact any type of led vehicle utilized as a tractor and the primary object is the provision of an arrangement whereby in a train of any desired number of trailers, each of the several trailers will track in the exact path of the preceding trailers.

It is a well known fact that in certain parts of the country where the roads are in bad condition for the most part even under ideal weather conditions, these same roads are practically impassable under adverse weather conditions except where they are made passable by traffic. The result is that the roads are passable only by maintaining a vehicle in the packed trackways, and it is impossible to do this with a series of trailers in a train behind a tractor. As a matter of fact in connection with some of the narrow roadways, it is difficult and even impossible to make a turn and keep the several trailers of a train upon the road.

It is to overcome these disadvantages that my invention proposes a trailer construction by means of which trailers may be utilized in any desirable number in a train and will track in similar paths in making turns.

The invention depends for the most part upon the construction of the trailer itself, but has to do also with the connections between the trailers and the tractor.

In the accompanying drawings illustrating my present invention, appear several figures, of which—

Fig. 5 is a detail perspective view of one of the draw bar sections,

Figure 2:
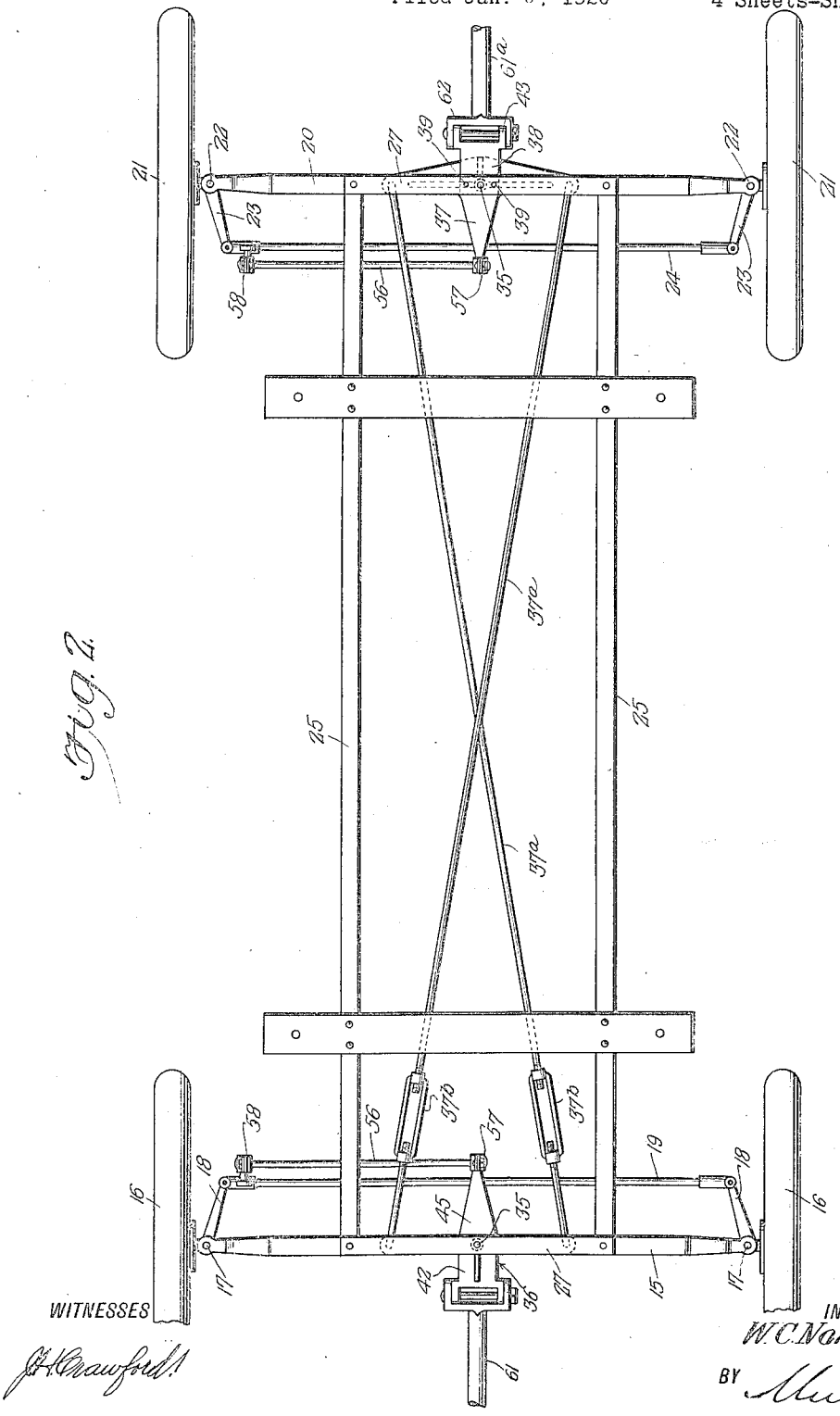
Fig. 2 is a top plan view of one of the trailers.
Figure 3:
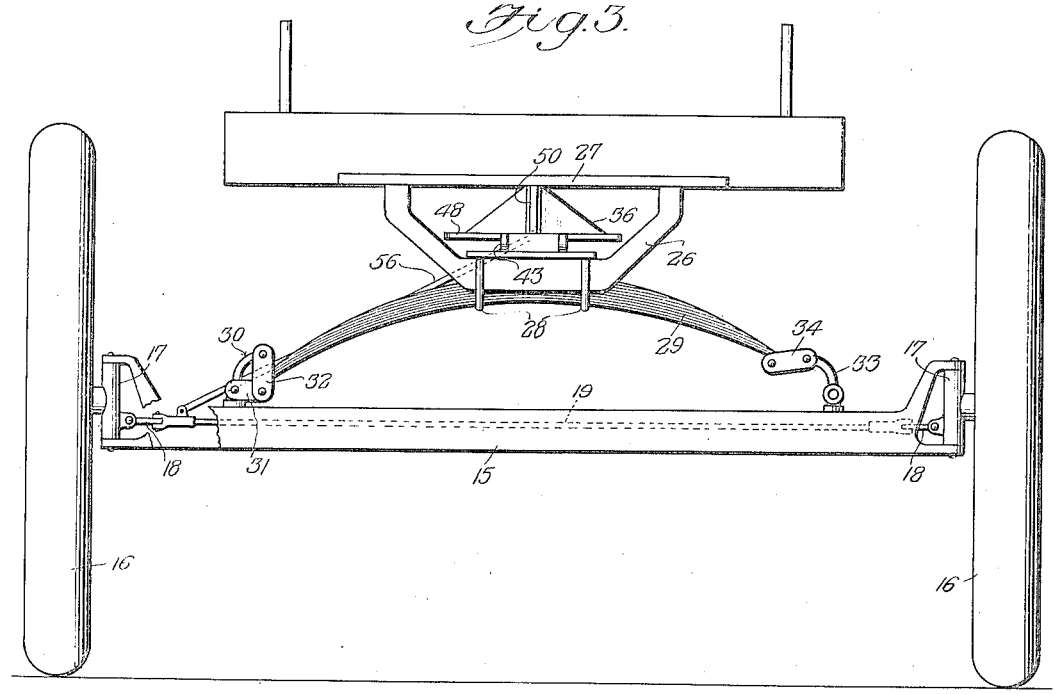
Fig. 3 is an end view of the front end of one of the trailers.
Figure 4:
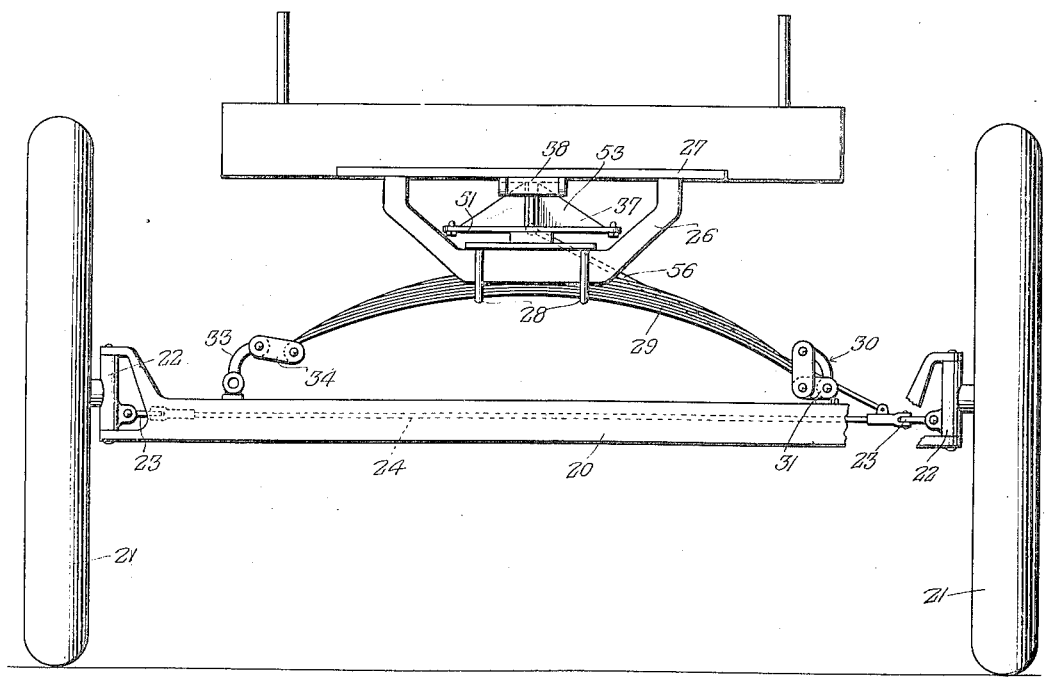
Fig. 4 is an end view of the rear end of one of the trailers.
Figure 9:
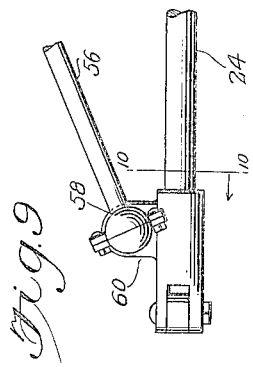
Fig. 9 is an elevation of certain portions of the connections to be hereinafter specifically described.

Referring now to these figures the invention proposes a trailer construction in which the front and rear axle assemblies are similar, the front axle 15 as seen in Fig. 2 having wheels 16 connected to its opposite ends by steering knuckles 17, provided with steering arms 18 connected by a tie rod 19. Similarly the rear axle 20 has wheels 21 connected thereto by steering knuckles 22 and provided with steering arms 23 connected by a tie rod 24. The body may be of any construction mounted upon longitudinal frame bars 25 rigidly connected in spaced apart relation by any suitable bracing means including U-shaped cross channels 26 at the opposite ends of the frame bars, and cross bars 27 above the cross channels 26. These cross channels are secured, by spring clips 28, to the central portions of transverse springs 29 and these springs as will be seen by reference to Figures 3 and 4 are so connected to the axles as that lowering movement of the body or frame of each trailer against the tension of its springs, will carry the body entirely toward one side and thus prevent movement downwardly in a straight line for reasons which will be presently apparent.

To do this, one end of each of the springs 29 is connected to its spring hanger 30, anchored on the respective shaft, with bracing links 31 so connected to the usual swinging links 32 and to the spring hanger 30 as to prevent shifting of this particular end of the spring longitudinally of the axle. At its opposite end each spring is connected to its hanger 33 by freely swinging links 34 disposed at a greater angle than normal with respect to the spring hanger so as to permit of a greater range of movement of this particular end of the spring longitudinally of the axle than is ordinarily the case.

Any suitable bracing or strengthening of the body frame may be resorted to, i. e., as permitted by the action of the relatively moving parts, as described and to be further referred to.

Connecting the central portion of each of the end cross pieces 27 of the frame, with the central portion of the respective channel cross piece 26 is a vertical bolt 35. The forward bolt 35 extends through a front wheel turning arm 36 and the rear bolt extends through a rear turning lever 37 and also through a draw bar attaching plate 38, the latter of which is rigidly connected to the rear cross bar 27 by additional bolts 39 passing through its openings 40 at opposite sides of its opening 41 receiving the rear bolt 35.

Figure 7:
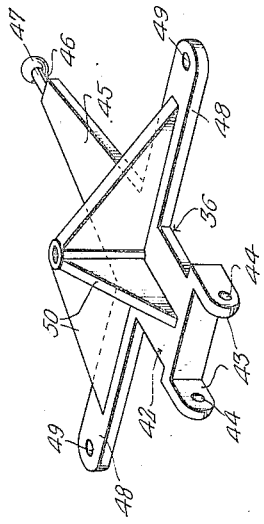
Fig. 7 is a detail perspective view of the front wheel turning lever.

The forward wheel turning lever 36 has a forward extension 42 terminating in forwardly extending and laterally spaced ears 43 provided with apertures 44, and the lever also has a rear extension 45 provided with a rear shank 46 terminating in a ball 47. The laterally projecting arms 48 of the front wheel turning member have apertures 49 adjacent to their extremities and the forward and rear extensions as well as laterally projecting arms are preferably braced by bracing webs, seen particularly in Fig. 7.

Figure 8:
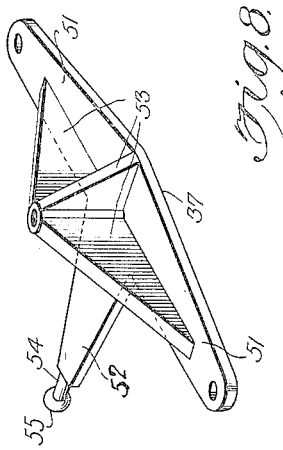
Fig. 8 is a similar view of the rear wheel turning lever.
Figure 10:
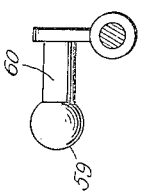
Fig. 10 is a sectional view taken on line 10—10 of Fig. 9.
Figure 6:
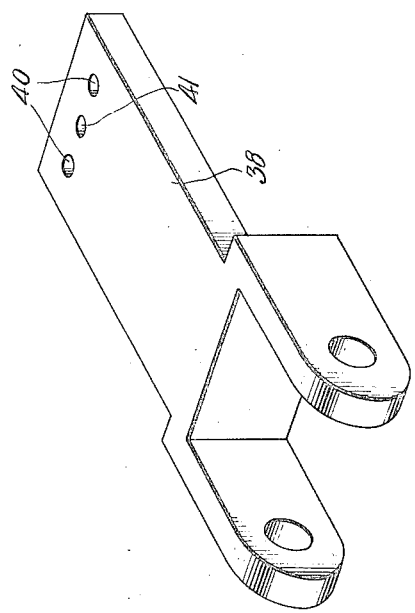
Fig. 6 is a detail perspective view of one of the rear draw bar connections.

The rear wheel turning lever 37 seen clearly in the detail of Fig. 8 has laterally projecting arms 51 and a forward extension 52 braced by webs 53 and the forward extension of which has a shank 54 provided with a terminal ball 55.

Crossed connecting rods 37ª are utilized to connect the front and rear wheel turning levers, and each of these rods is preferably in sections with a turnbuckle connection 37ᵇ so that its effective length my be properly adjusted and each rod has one end thereof loosely connected through one apertured laterally projecting arm 48 of the front wheel turning lever 36, with its opposite end similarly engaged through the oppositely projecting lateral arm 51 of the rear wheel turning lever.

Each of these levers 36 and 37 is connected to its respective tie rod 19, 24, by a connecting arm 56 provided with sockets 57 and 58 at its inner and outer ends, the inner socket 57 of which engages the respective ball 47 or 55 and the outer socket 58 of which engages a ball 59 at the end of a stud 60, the opposite end of which is secured to the tie rod.

By reference to Fig. 2 in particular it will be noted that the two connecting arms 56 extend to the same side of the main frame and to one side where the springs 29 are held against movement lengthwise of the axles, thus permitting the inner portions of the connecting arms 56 to swing upwardly and downwardly during movement of the trailer body or frame with respect to the axles without shifting the outer ends of the connecting arms inwardly and downwardly as would otherwise be the case.

The draw bars between trailers are preferably in two sections, each of which is alike except as to length, and each section 61, 61ª one of which is shown in detail in Fig. 5 has yoke shaped extensions 62 and 63 at its opposite ends, the spread of one of which is greater than that of the other. These yoke shaped extensions are disposed at right angles with respect to one another so that the adjacent yokes 62 and 63 of each complete draw bar are pivoted by a vertical bolt, as seen in Fig. 1, while the yokes at the opposite ends of the draw bar are pivoted by horizontal bolts to the rear attaching plate 38 of one trailer or the tractor and to the front wheel turning lever 36 of another trailer.

Thus as connected trailers pass along a roadway, one trailer may shift to a plane above or below the others by virtue of vertical swinging connection of the draw bars with the trailers and as each trailer approaches and commences a turn, the following trailer will be drawn to the same point of turning by virtue of the horizontal swinging connection between the ends of the draw bar sections. As each trailer makes a turn, its front and rear wheels are turned in relatively opposite directions by virtue of the crossed connecting rods between the front and rear wheel turning levers, but this movement does not at that time affect the succeeding trailer in view of the fact, that the forward section of each draw bar is connected to the rear part of the frame of the preceding trailer and thus each succeeding trailer will be drawn to the same point of turning as that to which the preceding trailer was drawn before its wheels were turned.

Figure 1:
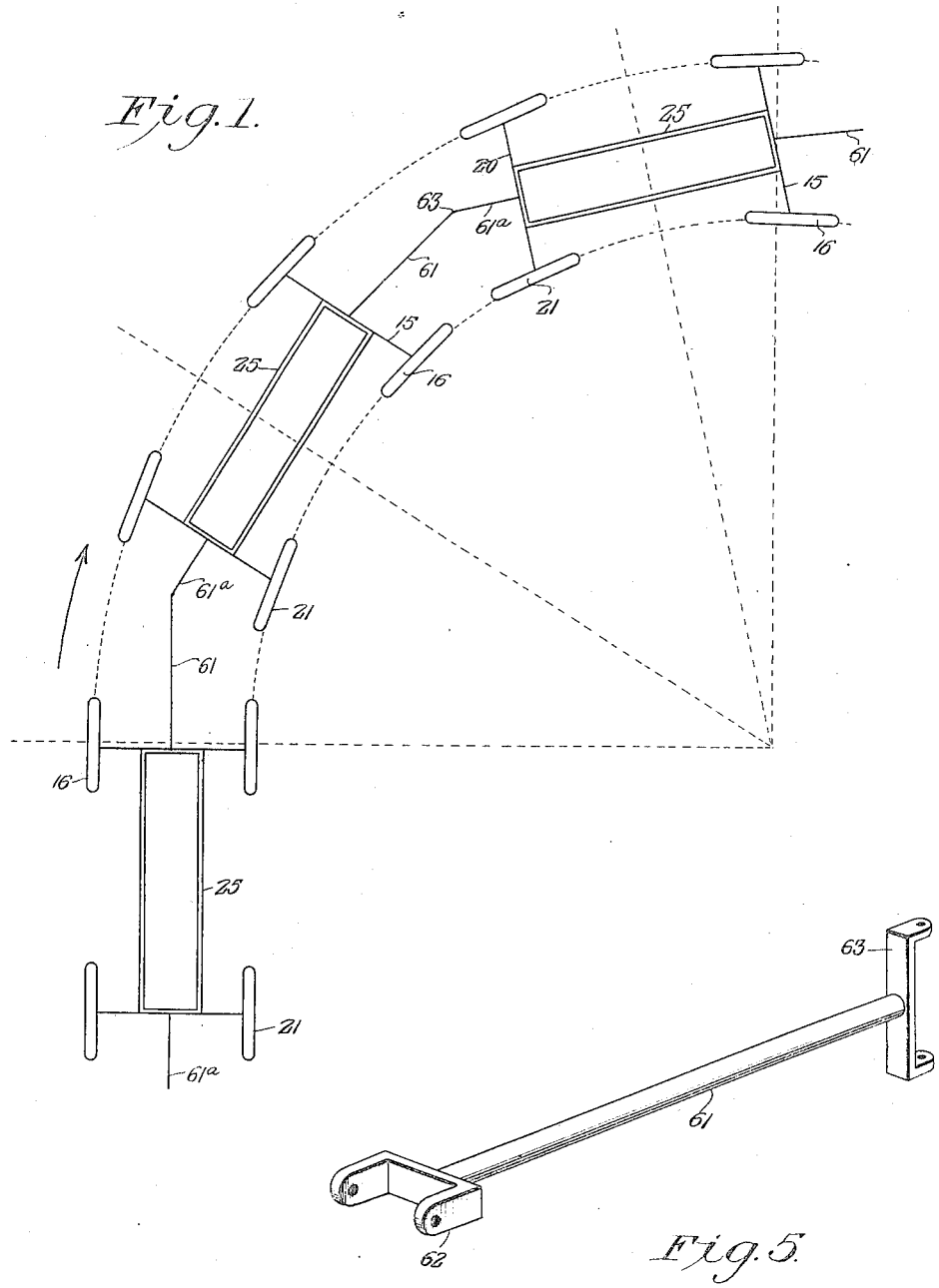
Fig. 1 is a diagram in top plan illustrating several trailers in the making of a turn.

This follows from the fact that the front draw bar section of each trailer extends parallel to the front wheels at all times, while the rear draw bar section of each trailer and the tractor extends parallel to the frame of the vehicle, so that by properly proportioning the lengths of the front and rear draw bar sections, the frame of each trailer on a turn will be maintained perpendicular to the radius of the circle of the turn, and its wheels will be maintained in the same circular path as shown in Figure 1.

In this way, the trailers of a train of any number will all be caused to track in the same path, and by virtue of the connections between the wheel turning levers and the wheel shifting tie rods, as well as the particular connections between the body springs and the axles, it is obvious that vertical movement of the bodies may freely take place without shifting movement of the wheels through the wheel turning connections.

It is furthermore obvious that considerable advantage is derived by a trailer construction in which the front and rear assemblies are the same, and that considerable reduction in friction is had by virtue of turning of the front and rear wheels in relatively opposite directions, which enables a turn to be made without danger of swaying or side-slipping and without side pressure against the load carried thereby.

I claim:—

A tractor trailer including front and rear axles, wheels turnably connected to the ends of the said axles, a body, springs between the body and the axles, disposed transversely in respect to the body, each of said springs having a stationary support at one end and a swinging support at its opposite end in connection with its respective axle, and wheel turning means including connections between the body and the wheels arranged at that side of the body adjacent to the stationary connections of the spring ends.

WILLIAM CAMPBELL NABORS.